(12) United States Patent
Nagasawa (10) Patent No.: US 7,522,539 B2
(45) Date of Patent: Apr. 21, 2009

(54) NETWORK MANAGEMENT SYSTEM AND TRANSMISSION APPARATUS MANAGED BY THE NETWORK MANAGEMENT SYSTEM

(75) Inventor: Hidemasa Nagasawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 614 days.

(21) Appl. No.: 11/034,560

(22) Filed: Jan. 13, 2005

(65) Prior Publication Data
US 2005/0122967 A1  Jun. 9, 2005

Related U.S. Application Data

(63) Continuation of application No. PCT/JP02/12575, filed on Dec. 2, 2002.

(51) Int. Cl.
*H04L 12/56* (2006.01)
*H04J 1/16* (2006.01)

(52) U.S. Cl. .................. 370/254; 370/252; 370/386; 709/223

(58) Field of Classification Search .......... 370/252, 370/389, 352, 329, 386, 356, 254; 455/427; 709/223; 712/11; 345/716
See application file for complete search history.

(56) References Cited

U.S. PATENT DOCUMENTS

| | | | |
|---|---|---|---|
| 6,058,419 A | 5/2000 | Taniguchi | |
| 6,370,572 B1 | 4/2002 | Lindskog et al. | |
| 6,542,739 B1 * | 4/2003 | Garner | 455/427 |
| 7,020,697 B1 * | 3/2006 | Goodman et al. | 709/223 |
| 7,263,597 B2 * | 8/2007 | Everdell et al. | 712/11 |
| 2002/0001307 A1 * | 1/2002 | Nguyen et al. | 370/386 |

FOREIGN PATENT DOCUMENTS

| | | |
|---|---|---|
| JP | 4-017429 | 1/1992 |
| JP | 7-226777 | 8/1995 |
| JP | 7-283820 | 10/1995 |
| JP | 8-182080 | 7/1996 |
| JP | 9-055733 | 2/1997 |
| JP | 10-210054 | 8/1998 |
| JP | 11-68816 | 3/1999 |
| JP | 3149816 | 1/2001 |
| JP | 2001-036587 | 2/2001 |
| JP | 2002-524969 | 8/2002 |

OTHER PUBLICATIONS

International Search Report dated Mar. 18, 2003.

* cited by examiner

*Primary Examiner*—John Pezzlo
(74) *Attorney, Agent, or Firm*—Fujitsu Patent Center (57) ABSTRACT

A network management system (NMS) for setting a cross connect or path of a transmission network constituted by transmission apparatuses (NE) that cross connect and transmit signals. Among a plurality of NMSes, a cross-connect set by an upper NMS cannot be changed by a lower NMS. A command of setting, change or cancellation of a cross connect transmitted from an NMS to NEs is added together with the information indicative of an NMS that is a source of the setting, changes or cancellation. When changing or canceling a cross connect, an NMS compares itself with the information indicative of an NMS that is a source of setting (or changing) the cross connect, judges whether the self has an authority to implement the setting or cancellation, and if having the authority, then transmits a change or cancellation command. The NEs also perform similar judgment, and if a source of change or cancellation has the authority, a source of change or cancellation has the authority, it changes or cancels a cross connect.

8 Claims, 9 Drawing Sheets

| tid | aidtype | fromAID | toAID | system NM | system EM | source NM | source EM | perm EM | perm LCT | allow NE |
|---|---|---|---|---|---|---|---|---|---|---|
| NE#1 | VC12 | 1-1-1-1-1 | 3-1-1-1-1 | 1 | 0 | 0 | 0 | 0 | 0 | 0 |
| NE#2 | VC12 | 1-1-1-1-2 | 2-1-1-1-2 | 1 | 0 | 1 | 1 | 0 | 0 | 0 |
| ......... | ......... | ......... | ......... | ......... | ......... | ......... | ......... | ......... | ......... | ......... |
| NE#3 | VC4 | 1-4 | 2-4 | 1 | 0 | 1 | 0 | 1 | 0 | 0 |
| NE#4 | VC44C | 1-5 | 4-1 | 1 | 0 | 1 | 0 | 0 | 0 | 1 |

| tid | aidtype | fromAID | toAID | source NM | source EM | perm EM | perm LCT | allow NE |
|---|---|---|---|---|---|---|---|---|
| NE#1 | VC12 | 1-1-1-1-1 | 3-1-1-1-1 | 1 | 0 | 0 | 0 | 0 |
| NE#2 | VC12 | 1-1-1-1-2 | 2-1-1-1-2 | 0 | 1 | 0 | 0 | 0 |
| ... | ... | ... | ... | ... | ... | ... | ... | ... |
| NE#3 | VC4 | 1-4 | 2-4 | 1 | 0 | 1 | 0 | 0 |
| NE#4 | VC44C | 1-5 | 4-1 | 1 | 0 | 0 | 0 | 1 |

NETWORK MANAGEMENT SYSTEM AND TRANSMISSION APPARATUS MANAGED BY THE NETWORK MANAGEMENT SYSTEM

CROSS-REFERENCE TO RELATED APPLICATION

This application is a continuation of an International Application No. PCT/JP02/12575 which was filed on Dec. 2, 2002, which is herein incorporated by reference.

TECHNICAL FIELD

The present invention relates generally to a network management system for managing a transmission network, and more particularly, to a network management system for cross-connects and path entry of a transmission network composed of transmission apparatuses for cross-connects of signals for transmission.

The present invention relates further to a transmission apparatus making up the transmission network, and more specifically, to a transmission apparatus for cross-connecting signals for transmission.

BACKGROUND ART

Among conventional methods for remotely maintaining communication monitoring apparatuses located at remote sites is a software remote maintenance method described in Japanese Patent Application Laid-Open Publication No. 2006-182080. In the software remote maintenance method, a data collection/control network is built up by mutually connecting via intra-network lines the communication monitoring apparatuses separately located at different areas. Each of the communication monitoring apparatuses determines whether a maintenance command input from a maintenance terminal is directed to a remote site or to own site, and if directed to the remote site, adds a destination address and a source address used in the network to the maintenance command, for transmission to the remote communication monitoring apparatus through the intra-network lines.

On the contrary, a transmission network having transmission apparatuses such as cross-connect apparatuses, optical cross-connect apparatuses, etc., in the SONET/SDH (Synchronous Optical Network/Synchronous Digital Hierarchy) system or the WDM (Wavelength Division Multiplexing) system is provided with a network management system (NMS) for entering cross-connects of the transmission apparatuses and entering paths in the transmission network.

With progress of enlargement in scale and capacity of the transmission network, recent years are experiencing introduction of such a hierarchized NMS as represented by a hierarchical model of the TMN (Telecommunication Management Network). This hierarchical model is provided with e.g., an upper network management layer of NMS (NMS-NML) and a lower element management layer of NMS (NMS-EML). The NMS-NML provides a centralized management of the overall transmission network, whereas portions of the transmission network are managed by the NMS-EML managing the portions of the transmission network.

The state of the art allows entering, editing, etc., of the cross-connects to be effected equally by the NMS-NML, the NMS-EML and a local craft terminal (LCT) coupled directly to each of the transmission apparatuses to enter cross-connects of the transmission apparatuses. Therefore, any one of the NMSes and LCTs could fully operate the cross-connect facilities in case that user accounts used have the authority to perform entering, edit, cancellation (deletion), etc., of the cross-connects.

However, when the respective layers of NMSes and LCTs have the same authority to allow free entering, edit, deletion, etc., of the cross-connects in this manner, if adequate communications are not secured between the persons in charge of maintenance using the respective layers, there may possibly arise inconsistencies in entering of the cross-connects to throw the entire system into confusion, resulting in failures such as incorrect transmission of signals.

DISCLOSURE OF THE INVENTION

It is the object of the present invention to enter the cross-connects of the transmission apparatuses without any inconsistencies to ensure correct transmissions of signals in a transmission network managed by a plurality of network management systems that are hierarchized.

A network management system in accordance with the present invention is a network management system for managing a transmission apparatus cross-connecting signals for transmission, the system comprising an input unit configured to input entry of a cross-connect of the transmission apparatus, edit of the cross-connect entered into the transmission apparatus, or cancellation of the cross-connect entered into the transmission apparatus; a command generating unit configured to generate a command to instruct the transmission apparatus on the entry, the edit or the cancellation of the cross-connect input by the input unit; an information adding unit configured to add information indicative of a network management system serving as an entry source, an edit source or a cancellation source to the command generated by the command generating unit; and a transmitting unit configured to transmit to the transmission apparatus the command with the information added thereto by the information adding unit.

A network management system in accordance with the present invention is a network management system for managing a transmission apparatus cross-connecting signals for transmission, the system comprising an input unit configured to input entry of a cross-connect of the transmission apparatus, edit of the cross-connect entered into the transmission apparatus, or cancellation of the cross-connect entered into the transmission apparatus; a specifying unit configured to specify a network management system to which authority to edit or cancel the cross-connect is transferred; a command generating unit configured to generate a command to instruct the transmission apparatus on the entry, the edit or the cancellation of the cross-connect input by the input unit; an information adding unit configured to add information indicative of a network management system specified by the specifying unit to the command generated by the command generating unit; and a transmitting unit configured to transmit to the transmission apparatus the command with the information added thereto by the information adding unit.

A network management system in accordance with the present invention is a network management system for managing a transmission apparatus cross-connecting signals for transmission, the transmission apparatus storing entry information on the cross-connect in association with information on an entry source of the cross connect, the system comprising an input unit configured to input a verification request for the entry information on the cross-connect of the transmission apparatus; a command generating unit configured to generate a verification request command based on the verification request input by the input unit; a transmitting unit configured to transmit to the transmission apparatus the verification request command generated by the command generating unit; a receiving unit configured to receive the entry information and the entry source information replied from the transmission apparatus; a display unit configured to display the entry information and the entry source information received by the receiving unit in association with each other.

A network management system in accordance with the present invention is a network management system for managing a transmission apparatus cross-connecting signals for transmission, the system comprising an input unit configured to input an instruction for blanket transfer of authority to edit or cancel a cross-connect of the transmission apparatus to a lower network management system; a command generating unit configured to generate an edit permit command or a cancellation permit command of the cross-connect of the transmission apparatus in response to the instruction for blanket transfer input by the input unit; and a transmitting unit configured to transmit to the transmission apparatus the edit permit command or the cancellation permit command generated by the command generating unit.

A network management system in accordance with the present invention is a network management system for managing a transmission apparatus cross-connecting signals for transmission, the system comprising an input unit configured to input blanket inhibition of edit or cancellation of a cross-connect of the transmission apparatus effected by a lower network management system; a command generating unit configured to generate an edit inhibit command or a cancellation inhibit command ordering blanket inhibition input by the input unit; and a transmitting unit configured to transmit to the transmission apparatus the edit inhibit command or the cancellation inhibit command generated by the command generating unit.

A network management system in accordance with the present invention is a network management system for managing a transmission apparatus cross-connecting signals for transmission, the transmission apparatus storing permission status indicative of whether authority to edit or cancel an entered cross-connect is blanket transferred to a lower network management system, the system comprising an input unit configured to input a status verify request for blanket transfer of the authority to edit or cancel the cross-connect of the transmission apparatus to the lower network management system; a command generating unit configured to generate a permission status verify command based on the status verify request input by the input unit; a transmitting unit configured to transmit to the transmission apparatus the permission status verify command generated by the command generating unit; a receiving unit configured to receive permission information replied from the transmission apparatus; a display unit configured to display permission status received by the receiving unit.

A transmission apparatus according to the present invention is a transmission apparatus cross-connecting signals for transmission, comprising a command receiving unit arranged to receive from a network management system a command ordering entry of a cross-connect, edit of the entered cross-connect or cancellation of the entered cross-connect, the command containing information representative of the network management system serving as an entry source, an edit source or a cancellation source; a control unit arranged to enter, edit or cancel a cross-connect based on the command received by the command receiving unit; and a storing unit arranged to store the information representative of the network management system contained in the command received by the command receiving unit, in association with entry information on the entered or edited cross-connect.

BEST MODE FOR CARRYING OUT THE INVENTION

Configuration of a Transmission Network System

Figure 1:
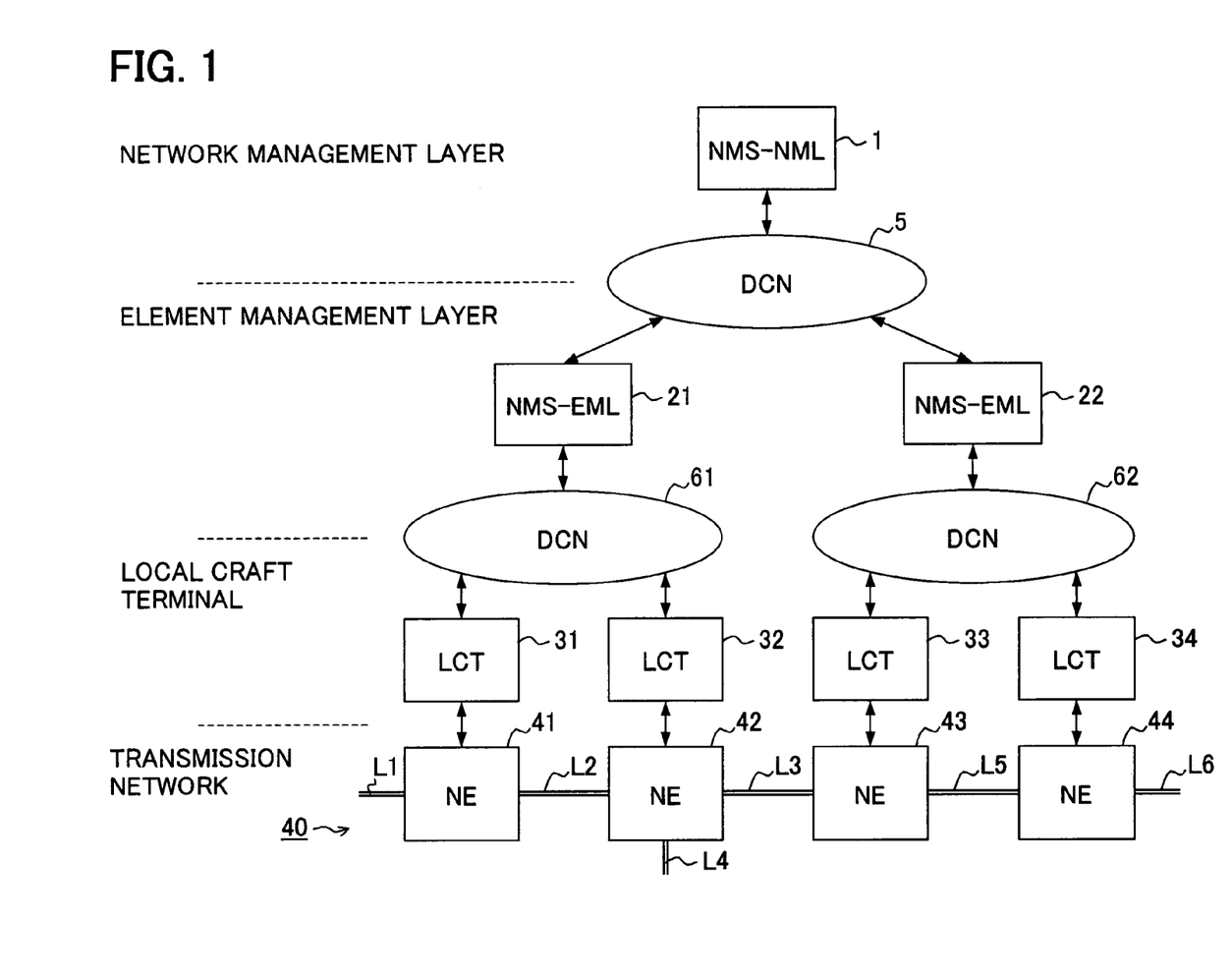
FIG. 1 is a block diagram showing the entire configuration of a transmission network system that includes network management systems (NMSes) and transmission apparatuses (NEs) in accordance with an embodiment of the present invention.

FIG. 1 is a block diagram showing the entire configuration of a transmission network system that includes network management systems and transmission apparatuses in accordance with an embodiment of the present invention.

The transmission network system has a transmission network generally designated at 40. The transmission network 40 is provided with a plurality of (e.g., four (4) in FIG. 1) network elements (NE) in the form of transmission apparatuses 41 to 44.

In the embodiment, the NEs 41 to 44 are cross-connect apparatuses: in the WDM (wavelength division multiplexing) system, they are optical cross-connect apparatuses for cross-connecting light signals with respective wavelengths in the state of light, whereas in the SONET/SDH (synchronous optical network/synchronous digital hierarchy) system, they are cross-connect apparatuses transposing the order of time-division-multiplexed time slots after conversion of the light signals into electrical signals. Transmission lines (e.g., optical fibers) L1 to L6 are connected to the NEs 41 to 44 which in turn transmit data signals (user signals) by way of the transmission lines L1 to L6.

The network management systems (NMSes) 1, 21 and 22 manage the transmission network 40, and, in particular, perform entering of a new cross-connect, and edit, cancellation (deletion) and retrieval of the entered cross-connect (hereinafter referred to generally as "entering, etc." except for the case where they are to specifically be identified) of the cross-connects of the NEs 41 to 44, as well as entering of data signal paths.

These NMSes are hierarchized into an upper layer of network management layer and a lower layer of element management layer in conformity with a hierarchical model of TMN (Telecommunication Management Network).

The network management layer is provided with the NMS (hereinafter referred to as NMS-NML) 1, whilst the element management layer is provided with the NMS (hereinafter referred to as NMS-EML) 21 and 22. For example, a single of the NMS-NML 1 is provided in the whole country, whilst the NMS-EML 21 and 22 are provided in each of two areas when the whole country is divided into two.

Although the two layers, upper and lower, are provided by way of example, the NMSes may be hierarchized into three or more layers. To ensure that the entering, etc., of the cross-connects of the NEs 41 to 44 are done at respective sites where the NEs 41 to 44 are respectively placed, local craft terminals (LCTs) 31 to 34 are directly coupled to the NEs 41 to 44, respectively. The LCTs 31 to 34 perform the entering, etc., of the cross-connects of the respective NEs 41 to 44 directly coupled thereto, respectively.

The entering, etc., of the cross-connects are performed by the NMS-NML 1, NMS-ELM 21 or 22, or LCTs 31 to 33 sending commands for entering, etc., to the NEs 41 to 44. The NMS-NML 1 and the NMS-EMLs 21 and 22 are connected to each other via a data communication network (DCN) 5, whilst the NMS-EML 21 and the LCTs 31 and 32 are connected to each other via a DCN 61, with the NMS-EML 22 and the LCTs 33 and 34 are connected to each other via a DCN 62. The commands for entering, etc., of the cross-connects are sent from the NMS-NML 1 or the NMS-ELM 21 or 22 via the DCNs to the NEs 41 to 44.

Depending on the layers, the NMS-NML 1 and the NMS-EMLs 21 and 22 provide different NEs with management/control (esp., entering, etc., of cross-connects, entering, etc., of paths). The NMS-NML 1 is intended for all the NEs 41 to 44 existing in the transmission network 40, whereas the NMS-EML 21 is intended for the NEs 41 and 42, with the NMS-EML 22 intended for the NEs 43 and 44.

Depending on the layers, the pecking order is defined of the authority to perform entering of a new cross-connect, and edit and deletion of the entered cross-connect. That is, the lower NMSes and LCTs cannot edit or delete the entries of the cross-connects newly entered or edited by the upper NMS. On the other hand, the upper NMSes can edit or delete the entries of the cross-connects newly entered or edited by the lower NMSes or LCTs.

For example, the lower NMS-EMLs 21 and 22 and the LCTs 41 to 44 cannot edit or delete the entries of the cross-connects newly entered or edited by the upper NMS-NML 1. On the other hand, the upper NMS-NML 1 can edit or delete the entries of the cross-connects newly entered or edited by the lower NMS-EML 21 or 22 or LCTs 41 to 44.

Similarly, the LCTs 31 and 32 cannot edit or delete the entries of the cross-connects newly entered or edited by the NMS-EML 21, whereas the NMS-EML 21 can edit or delete the entries of the cross-connects newly entered or edited by the LCTs 31 and 32. Furthermore, the LCTs 33 and 34 cannot edit or delete the entries of the cross-connects newly entered or edited by the NMS-EML 22, whereas the NMS-EML 22 can edit or delete the entries of the cross-connects newly entered or edited by the LCTs 33 and 34.

Due to the authority for edit and deletion of entered cross-connects being thus defined, the cross-connects entered by the upper NMSes are prevented from accidentally being edited by the lower NMS or LCTs, obviating the impedances such as signals incorrectly transmitting.

On the contrary, the upper NMS-NML 1 may transfer the authority for edit (and deletion) of the entered cross-connects to the lower NMS-EML 21 or 22 or LCTs 31 to 34. For example, the NMS-NML 1 can transfer the authority for edit (and deletion) of the cross-connects newly entered by itself, to the NMS-EML 21 or 22 or one of the LCTs 31 to 34. The NMS-ELM 21 can transfer the authority for edit (and deletion) of the cross-connects newly entered by itself to the LCTs 31 to 34. The authority-transferred NMS 21 or 22 or LCTs 41 to 44 can perform the edit (and deletion) of the entered cross-connects based on the transferred authority.

On the NE by NE basis, the upper NMSes can blanket-transfer the authority for edit (and deletion) of the entered cross-connects to the lower NMSes or LCTs. For example, the NMS-NML 1 can transfer the authority for edit (and deletion) of all the cross-connects entered for the NE 41, to the NMS-EML 21 or the LCT 31.

Such transferability of authority allows the edit (and deletion) of the entered cross-connects to flexibly be accommodated depending on the situations.

Furthermore, the upper NMSes may blanket-inhibit on the NE by NE basis the lower NMSes or LCTs having the authority for edit (and deletion) blanket-transferred from effecting the editing (and deleting) of the entered cross-connects. For example, the NMS-NML 1 can blanket-inhibit the NMS-EML 21 or the LCT 31 from effecting the edit (and deletion) of all the cross-connects entered for the NE 41.

The NMS-NML 1 and the NMS-EMLs 21 and 22 will hereinafter be referred to generally as NMS if they need not be specifically identified.

Configuration of NMS

Figure 2:
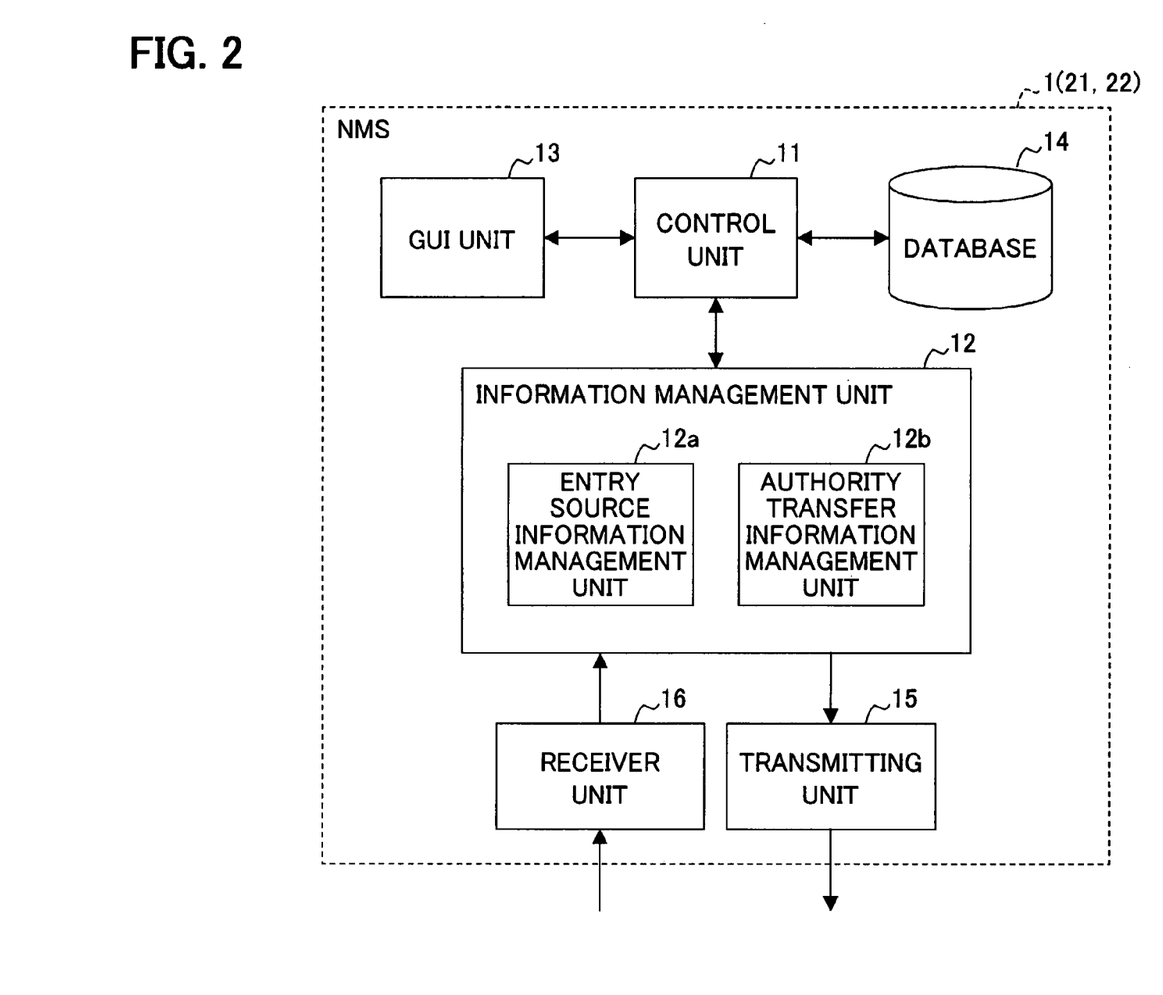
FIG. 2 is a block diagram showing the detailed configuration of the NMS.

FIG. 2 is a block diagram showing a detailed configuration of the NMS (NMS-NML1 and NMS-EML 21 and 22). The NMS includes a control unit 11, an information management unit 12, a GUI unit 13, a database 14, a transmitting unit 15, and a receiver unit 16. The information management unit 12 includes an entry source information management unit 12a and authority transfer information management unit 12b.

A network manager (or an operator, a person in charge of maintenance and service) may perform the entering, etc., of cross-connects of the NEs by use of an MMI (Man-Machine Interface) of the NMS or by directly inputting commands (e.g., TL-1 command) through an input device.

Figure 3:
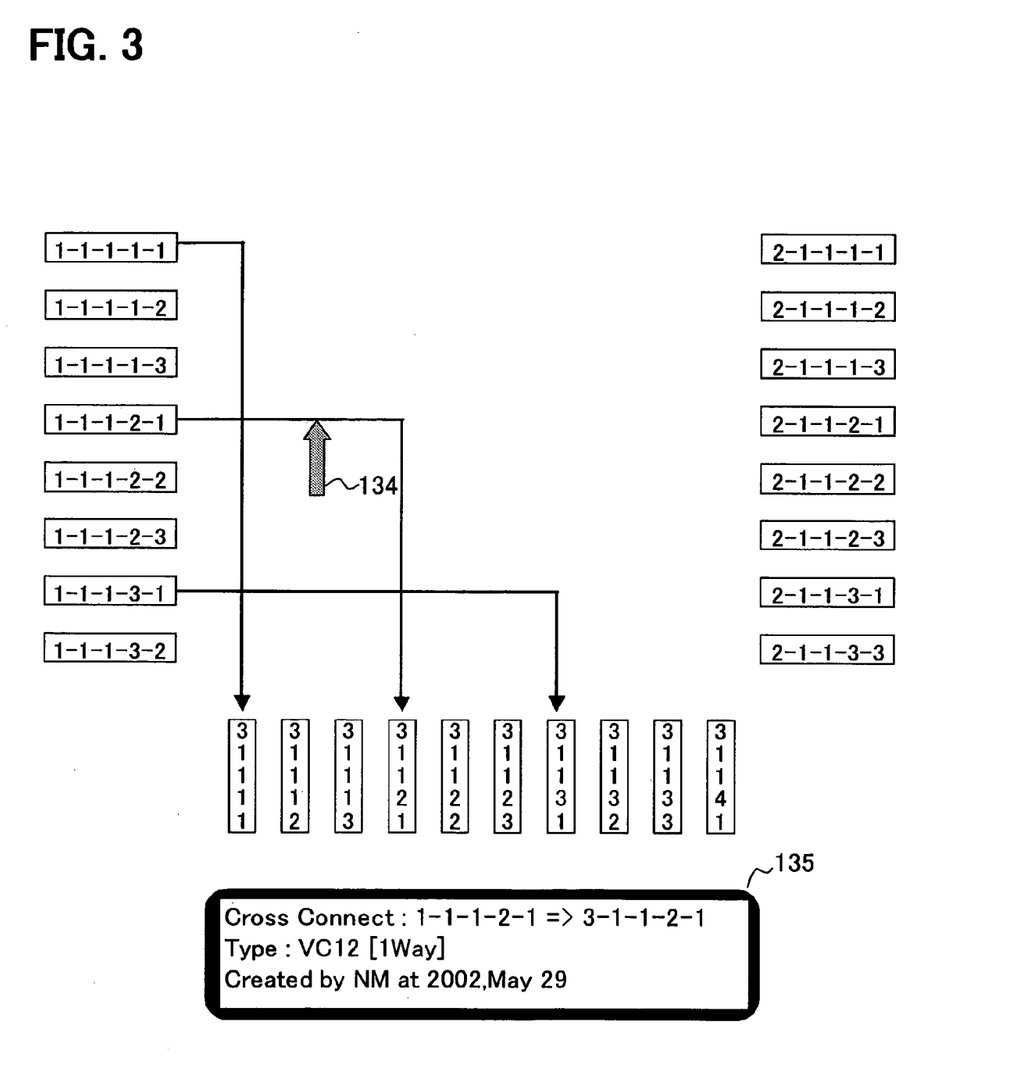
FIG. 3 shows an example of a cross-connect operating screen displayed by a graphical user interface (GUI) unit of the NMS.

The GUI unit 13 has for example a display device such as a CRT display and a liquid crystal display and an input device such as a mouse and provides GUI for the entering, etc., of the cross-connects to the network manager under the control of the control unit 11. FIG. 3 shows an example of an operation screen for the cross-connect displayed by the GUI unit 13.

This GUI provides a diagrammatical representation of a cross-connecting unit for performing cross-connects of the NEs 41 to 44 and ensures easy entering, etc., of the cross-connects by use of the input device such as the mouse.

In FIG. 3 is shown by way of example the cross-connecting unit of the NE 41 (refer to FIG. 1) having three transmission lines L2 to L4 connected thereto. Terminals 1-1-1-1-1 to 1-1-1-3-2 at the left end correspond to AIDs (Access Identifiers) of signals input to or output from the transmission line L2 extending between the NEs 41 and 42; terminals 2-1-1-1-1 to 2-1-1-3-3 at the right end correspond to the AIDs of signals input to or output from the transmission line L3 extending between the NEs 42 and 43; and terminals 3-1-1-1-1 to 3-1-1-4-1 at the lower end correspond to the AIDs of signals input to or output from the transmission line L4 extending downward from the bottom of the NE 42 in FIG. 1.

The terminals (i.e., AIDs) correspond to light signals with respective wavelengths in the WDM system, whilst they correspond to electrical signals at respective time slots in the SONET/SDH system.

The cross-connects are indicated by solid arrows joining two terminals (AIDs). In FIG. 3 are entered as an example three cross-connects, i.e., one from the input side AID 1-1-1-1-1 to the output side AID 3-1-1-1-1, one from the input side AID 1-1-1-2-1 to the output side AID 3-1-1-2-1 and one from the input side AID 1-1-1-3-1 to the output side AID 3-1-1-3-1. Although unidirectional cross-connects are shown, bidirectional cross-connects may also be entered, and in this case the cross-connects are indicated by bidirectional arrows.

In this GUI, a cross-connect between two AIDs (terminals) can newly be entered by connecting with a cursor (pointer) 134 the two AIDs (terminals) between which a cross-connect has not yet been entered. An AID having an already entered cross-connect may be changed into another AID by use of the cursor 134 so that the entered cross-connect can be edited. The cursor 134 may also be used to select an already entered cross-connect and to select "delete" (or "cancel") in a pop-up menu not shown, etc., so that the deletion (cancellation) of the entered cross-connects can be done.

Furthermore, one of the entered cross-connects may be selected with the cursor 134 to perform retrieval (verification) of the entered cross-connects, the retrieval of the entered cross-connect resulting in a display of information on the selected cross-connect in a window (or a dialog box) 135.

An upper section of the window 135 displays a connection relationship (i.e., an input side AID and an output side AID) of the cross-connect. An intermediate section displays a type (AIDTYPE) of a signal to be cross-connected. A lower section displays an NMS having entered the cross-connect by newly entering or editing, and a date of entering. The shown example indicates that a cross-connect from AID1-1-1-2-2 (FromAID) to AID3-1-1-2-1 (ToAID) has been entered (newly entered or edited) by the NMS-NML 1 at 2002, May 29.

Referring back to FIG. 2, the control unit 11 controls constituent elements of the NMSesuch as the information management unit 12, the GUI unit 13 and the database 14. The control unit 11 further updates a cross-connect management table stored in the database 14 based on an operation of the GUI unit 13 or on a command or response from another NMS.

Figure 4:
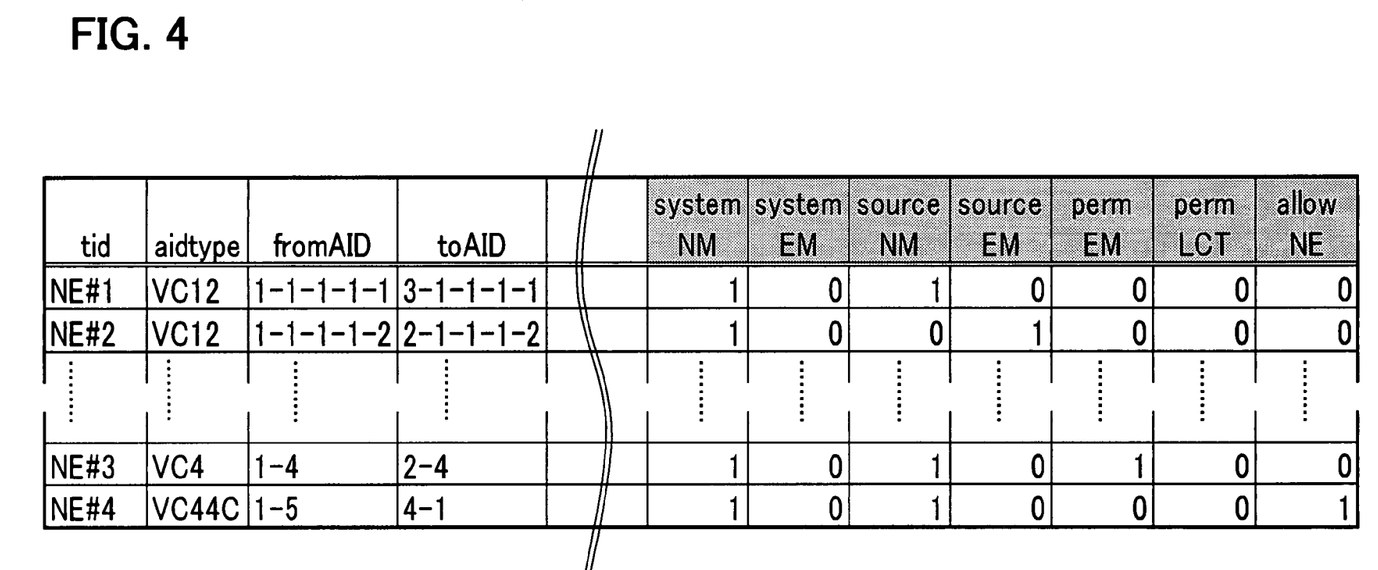
FIG. 4 shows an example of a cross-connect management table stored in a database of the NMS.

The database stores the cross-connect management table. FIG. 4 shows an example of the cross-connect management table stored in the database 14. Data in each line (one line in the transverse direction) is cross-connect management data indicative of the content of each individual cross-connect entered.

"tid" (Target ID) is an identifier (ID) of an NE having an entered cross-connect. "aidtype" (Access Identifier Type) is a type of the level of the signal to be cross-connected, and is e.g., VC4, VC12, VC44C, etc. "fromAID" is an input side AID (Access Identifier) of a cross-connected signal, whilst "toAID" is an output side AID of the cross-connected signal. For example, the cross-connect management data in the first line indicates that NE#1 (NE 41 in FIG. 1) has a cross-connect entered from AID1-1-1-1-1 to AID3-1-1-1-1 with the AID type being VC 12.

"systemNM" (NMS-NML 1) and "systemEM" (NMS-EML 21 or 22) indicate an NMS holding cross-connect management data, with the NMS having 1 as its value holding the cross-connect management data. In FIG. 4, "systemNM" is set to 1, which means that this cross-connect management data (table) is held by the NMS-NML 1.

"sourceNM" (NMS-NML 1) and "sourceEM" (NMS-EML 21 or 22) indicate an NMS having entered the cross-connect by newly entering or editing, with the NMS having 1 as its value being the NMS having entered the cross-connect. For example, the cross-connect management data in the first line indicates "sourceNM" set to 1, which means that NMS-NML 1 has entered the cross-connect. The cross-connect management data in the second line indicates "sourceEM" set to 1. Since this cross-connect management data belongs to the NE#2 (NE 42 in FIG. 1), this means that the NMS-ELM 21 managing the NE#2 has entered the cross-connect.

It is to be noted that the cross-connect having "sourceNM" and "sourceEM" set to 0 is a cross-connect entered by the LCT.

"permEM" is a flag indicating whether the authority for edit of entered cross-connect is transferred from the upper NMS-NML 1 to the lower NMS-EML 21 or 22, with the flag being set to 1 in the presence of transfer but to 0 in the absence of transfer.

As having been discussed hereinabove, although in principle the cross-connect entered by the upper NMS-NML 1 cannot be edited by the lower NMS-EML 21 or 22, the transfer of the authority enables the lower NMS-EML 21 or 22 to effect the edit of the entered cross-connect.

For example, "permEM" of the second lowest line data is set to 1, which means that the authority to edit the entering of the cross-connect from fromAID1-4 to toAID2-4 for the NE#3 (NE 43 in FIG. 1) is transferred to the NMS-EML 22 managing the NE#3. Thus, the NMS-EML 22 can edit the cross-connect entered by the upper NMS-NML 1.

"permLCT" is a flag indicating whether the authority for edit of the entered cross-connect is transferred from the NMS-NML 1 or the NMS-EML 21 or 22 to the LCT 31 to 34, with the flag being set to 1 in the presence of transfer, but to 0 in the absence of the transfer. Although in principle the cross-connect entered by the NMS-NML 1 or the NMS-EML 21 or 22 cannot be edited by the LCT 31 to 34, the transfer of authority enables the LCT 31 to 34 to effect the edit of the entered cross-connects.

It is to be noted that permEM and the perm LCT may encompass the transfer of authority to delete the entered cross-connect in addition to the transfer of the authority for edit of the entered cross-connect.

"allowNE" is a flag indicating whether the authority for edit of the entered cross-connect is blanket-transferred on the NE by NE basis, the flag being set to 1 in the presence of the blanket transfer, but to 0 in the absence of the blanket transfer. It is to be noted that similar to the permEM, allowNE may encompass the blanket transfer of authority to delete the entered cross-connect in addition to the blanket transfer of the authority for edit of the entered cross-connects.

This cross-connect management data may be created by an NMS when the NMS effects the newly entering, edit or deletion of the entered cross-connect, or alternatively, may be created by an NMS referencing with a retrieval command a cross-connect entry table (composed of provisioning data) (see FIG. 6) created in a database 84 (see FIG. 5) of the NE as will be described later.

Referring back to FIG. 2, the entry source information management unit 12a of the information management unit 12 adds source information indicative of the type (the type of whether it is the NMS-NML or NMS-EML) of the NMS (i.e., command sender) for performing the entering, etc., of the cross-connects to a source field of a command for entering, etc., of the cross-connects transmitted to the NE. The command with the source information added thereto is imparted to the transmitting unit 15. The transmitting unit 15 transmits the command with the source information via the DCN to the NE for entering the cross-connect.

For example, when the network manager uses the NMS-NML 1 to perform the entering, etc., of the cross-connects of the NE 42, information indicative of the type of the NMS-NML is added to the source field of the command. This command is then transmitted from the NMS-NML 1 to the NE 42 by way of the DCN 5, NMS-EML 21, DCN 61 AND LCT 32.

Figure 9:
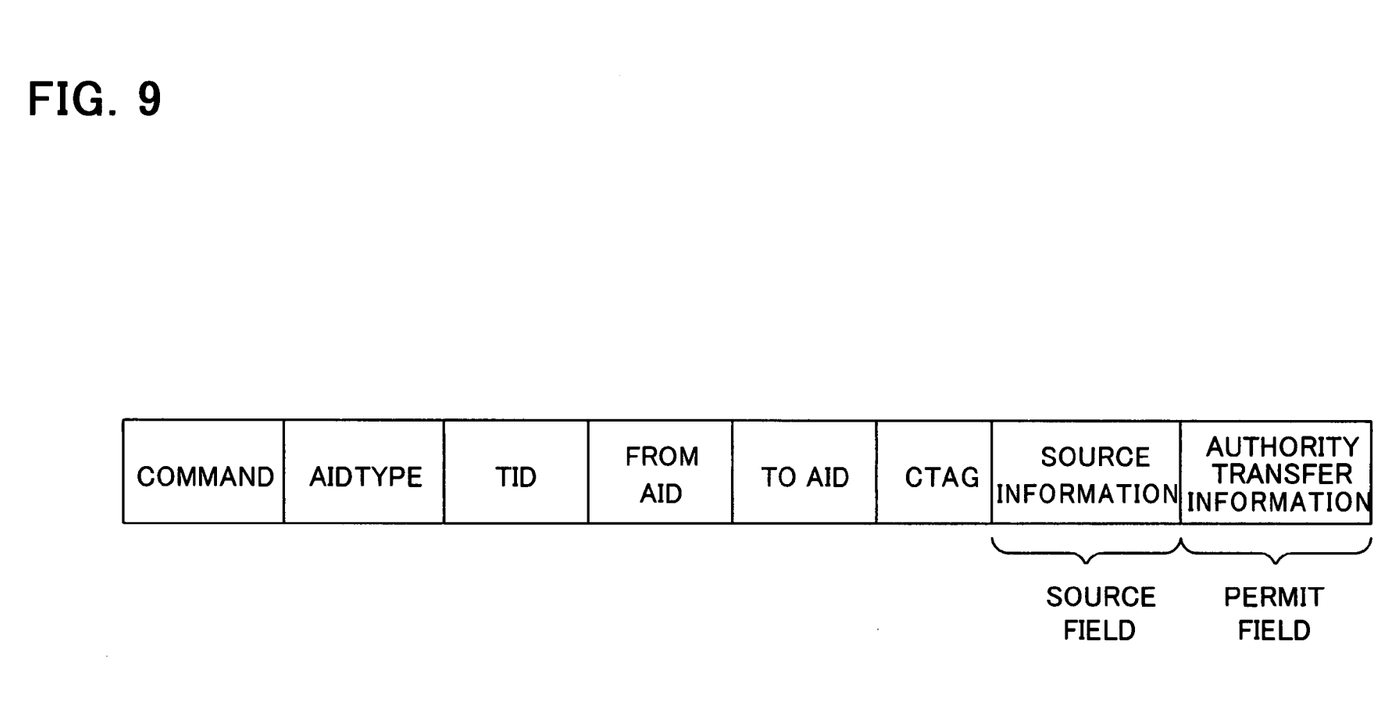
FIG. 9 shows an example of a data structure of a command issued from the NMS or the LCT.

An example of the command format is shown below. This format is a TL-1 command format. This format shows part of the command, the command being provided with, as shown in FIG. 9, the above-described source field to which the source information is added by the entry source information management unit 12*a*, and with a permit field to which authority transfer information is added by the authority transfer information management unit 12*b*.

(1) Format of cross-connect create command ENT-CRS-<AIDTYPE>:TID:<FROM AID>,<TO AID>:CTAG:::;
(2) Format of cross-connect edit command ED-CRS-<AIDTYPE>:TID:<FROM AID>,<TO AID>:CTAG:::;
(3) Format of cross-connect deletion command DLT-CRS-<AIDTYPE>:TID:<FROM AID>,<TO AID>:CTAG:::;
(4) Format of cross-connect retrieval command RTRV-CRS-<AIDTYPE>:TID:<FROM AID>,<TO AID>:CTAG;

Herein, "ENT-CRS" (Enter Cross-Connect) is a cross-connect create command, "ED-CRS" (Edit Cross-Connect) is a cross-connect edit command, "DLT-CRS" (Delete Cross-Connect) is a cross-connect deletion command, and "RTRV-CRS" is a cross-connect retrieval command.

Letter strings succeeding <AIDTYPE> are parameters of the commands. "AIDTYPE" is equivalent in meaning to "aidtype" of the cross-connect management table of FIG. 4, and "TID" is an identifier (ID) of the NE to fed with the command. "FROM AID" is an input side AID of a signal to be cross-connected, whilst "TO AID" is an output side AID of the signal to be cross-connected. "CTAG" is a correlation tag, and the NE, when returning a response to the NMS, identifies to which command the response is made by use of the correlation tag.

When transferring the authority to another NMS or the LCT, the authority transfer management unit 12*b* writes authority transfer information (e.g., identifier) indicative of the NMS or LCT to which the authority is to be transferred, into the permit field of the command shown in FIG. 9. Upon newly entering or editing with the GUI unit 13, the network manager specifies on the cross-connect to be newly entered or edited that the authority is transferred to another NMS or the LCT.

This specification is imparted from the GUI 13 via the control unit 11 to the authority transfer information management unit 12*b*, which in turn, based on the received specification, adds information indicative of an NMS or an LCT to which the authority is to be transferred, to the permit field of the create command or edit command. This command is sent from the transmitting unit 15 to the NE.

In case of blanket-transferring the authority for editing the entered cross-connects on the NE by NE basis, the authority management unit 12*b* issues a permit command for editing the entered cross-connects, in response to an instruction from the control unit 81.

The receiver unit 16 receives a response returned from the NE that has received the command. The response includes an execution complete response indicating that the NE has completed execution of the command and an execution NG response indicating that due to the lack of the authority to execute the command the NE cannot execute the command.

It is to be noted that the LCTs 31 to 34 have substantially the same configuration as that of the NMSe shown in FIG. 2 and send an create command, an edit command, a deletion command and a retrieval command of cross-connects to the NE to perform the entering., etc., of the cross-connects for the NE.

Configuration of NE

Figure 5:
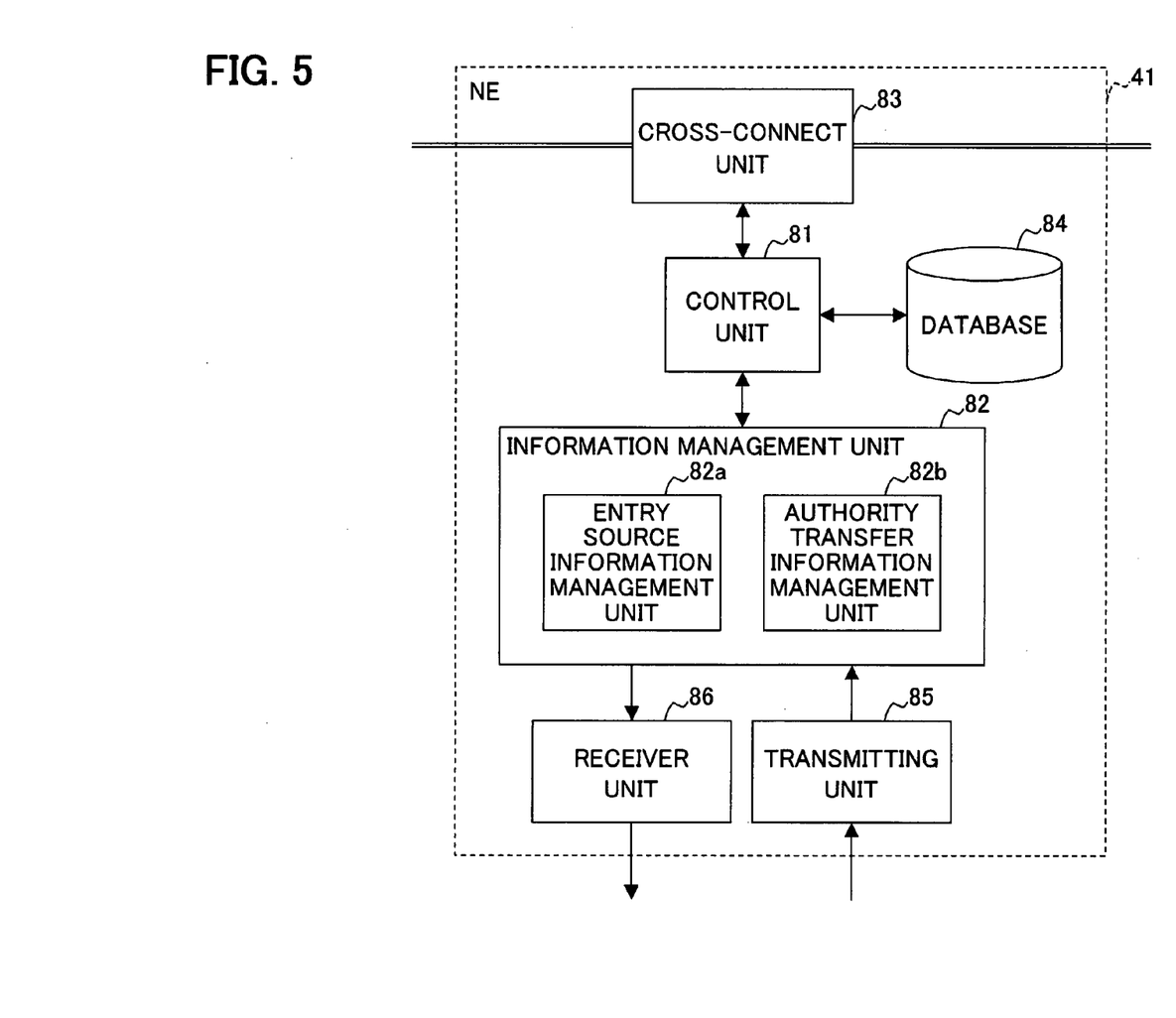
FIG. 5 is a block diagram showing the detailed configuration of a transmission apparatus acting as a network element (NE)

FIG. 5 is a block diagram showing the detailed configuration of the NE. The NE includes a control unit 81, an information management unit 82, a cross-connect unit 83, a database 84, a receiver unit 85 and a transmitting unit 86. The information management unit includes an entry source management unit 82*a* and authority transfer information management unit 82*b*.

The cross-connect unit 83 is connected to a transmission line and acts to cross-connect, for output, a data signal input in accordance with the cross-connect entered by the control unit 81.

The control unit 81 enters a cross-connect into the cross-connect unit 83 based on the command received by the receiver unit 85 and stores the content of the entered cross-connect into the database 84. After the entry of the cross-connect, the control unit 81 creates a response and sends the response via the information management unit 82 from the transmitting unit 86 to the NMS or the LCT that is the entry source.

Figure 6:
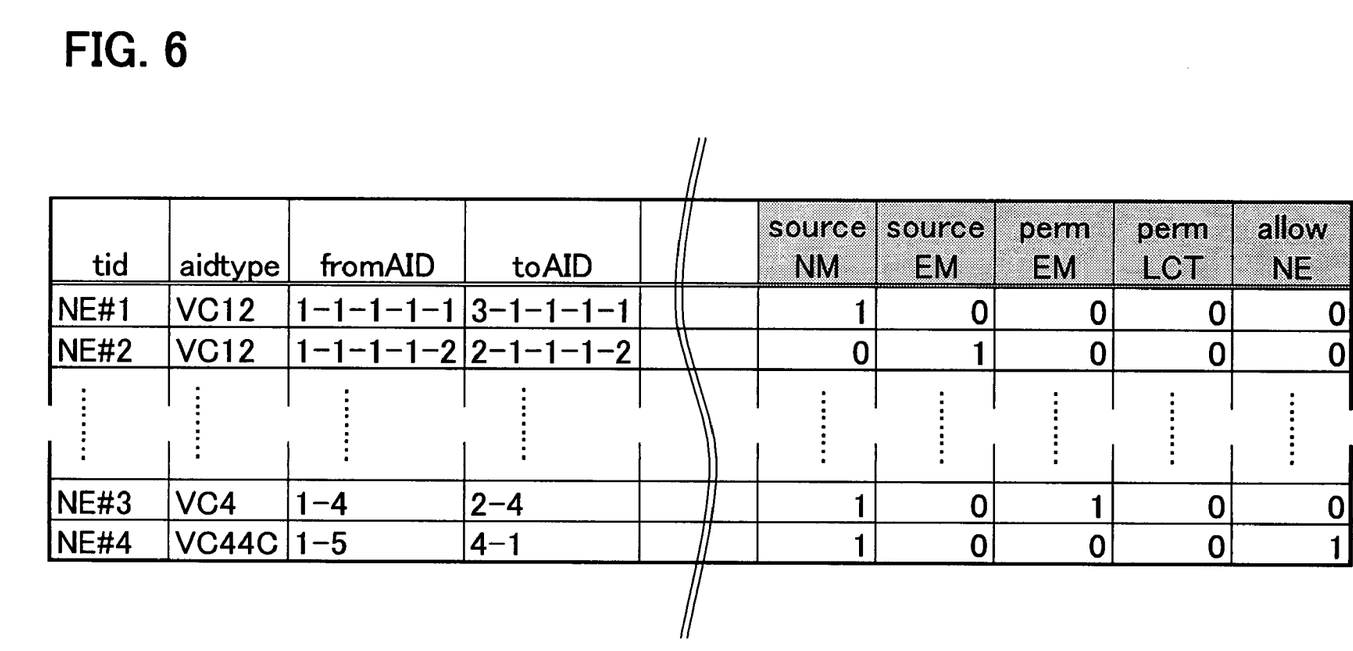
FIG. 6 shows an example of a cross-connect entry table stored in a database of the NE.

The database 84 stores a cross-connect entry table composed of cross-connect provisioning data representative of the content of the cross-connect entered into the NE. FIG. 6 shows an example of the cross-connect entry table stored in the database 84.

The meanings of "tid", "aidtype", "fromAID", "toAID", "sourceNM", "sourceEM", "permEM", "permLCT" and "allowNE" are the same as those in the above-described cross-connect management table of the NMS.

The entry source information management unit 82*a* and the authority transfer information management unit 82*b* manage respectively the source information and authority transfer information of the cross-connect, and, when performing the edit or deletion of the entered cross-connect, determine whether the entered cross-connect can be edited or deleted based on the command source information, authority transfer information, etc.

The receiver unit 85 receives a command from the NMS and imparts the received command to the information management unit 82. The transmitting unit 86 sends to the NMS a response to the command.

Description will be made hereinbelow of the operations of newly entering and editing, deleting and retrieving effected by the NMS and NE having the above configurations.

Operations Upon New Entering of Cross-Connect

When a new cross-connect is entered by the GUI unit 13 of the NMS, the control unit 11 creates an create command and imparts the created create command to the entry source information management unit 12*a* of the information management unit 12.

The entry source information management unit 12*a* adds the new entry source information to the source field of the create command, and thereafter sends this command via the transmitting unit 15 to the NE for entering the cross-connect.

The create command sent to the NE is received by the receiver unit 85 of the NE, which receiver unit 85 in turn imparts the received command via the information management unit 82 to the control unit 81. The control unit 81 enters a cross-connect into the cross-connect unit 83 based on the content of the create command, and concurrently registers (adds) cross-connect entry data on the entered cross-connect, into the cross-connect entry table of the database 84.

After the completion of the entering of the cross-connect, the control unit 81 sends an entry complete response via the information management unit 82 and the transmitting unit 86 to the NMS that is the entry source. The entry complete response is imparted via the receiver unit 16 and the information management unit 12 of the entry source NMS to the control unit 11 thereof. The control unit 11 notifies the network manager of the completion of entering by way of the GUI unit 13.

Similar processes are applied to the case where the LCT is the entry source of the new cross-connect.

In case that a new cross-connect cannot be entered, the control unit 81 does not register the cross-connect entry data into the database 84 but sends an entry disable response to the entry source NMS.

Upon sending of the create command or upon reception of the entry complete command, the control unit 11 of the entry source NMS may add the cross-connect management data on the newly entered cross-connect into the cross-connect management table stored in the database 14 to create the cross-connect management table.

The create command and the response (entry complete response or entry disable response) may be sent to another NMS and LCT managing the destination NE.

For example, in case that the NMS-NML 1 sends an create command to the NE 41, the create command, etc., are send also to the NMS-EML 21 and the LCT 31 managing the NE41. In case that the NMS-EML 21 sends an create command to the NE 42, the create command, etc., are sent also to the NMS-NML 1 and LCT 32 managing the NE 42. Similar to the entry source NMS, these other NMS and LCT may add cross-connect management data of the newly entered cross-connect to the cross-connect management table stored in their respective databases, based on the create command received.

Operation Upon Editing of Entered Cross-Connect

Figure 7:
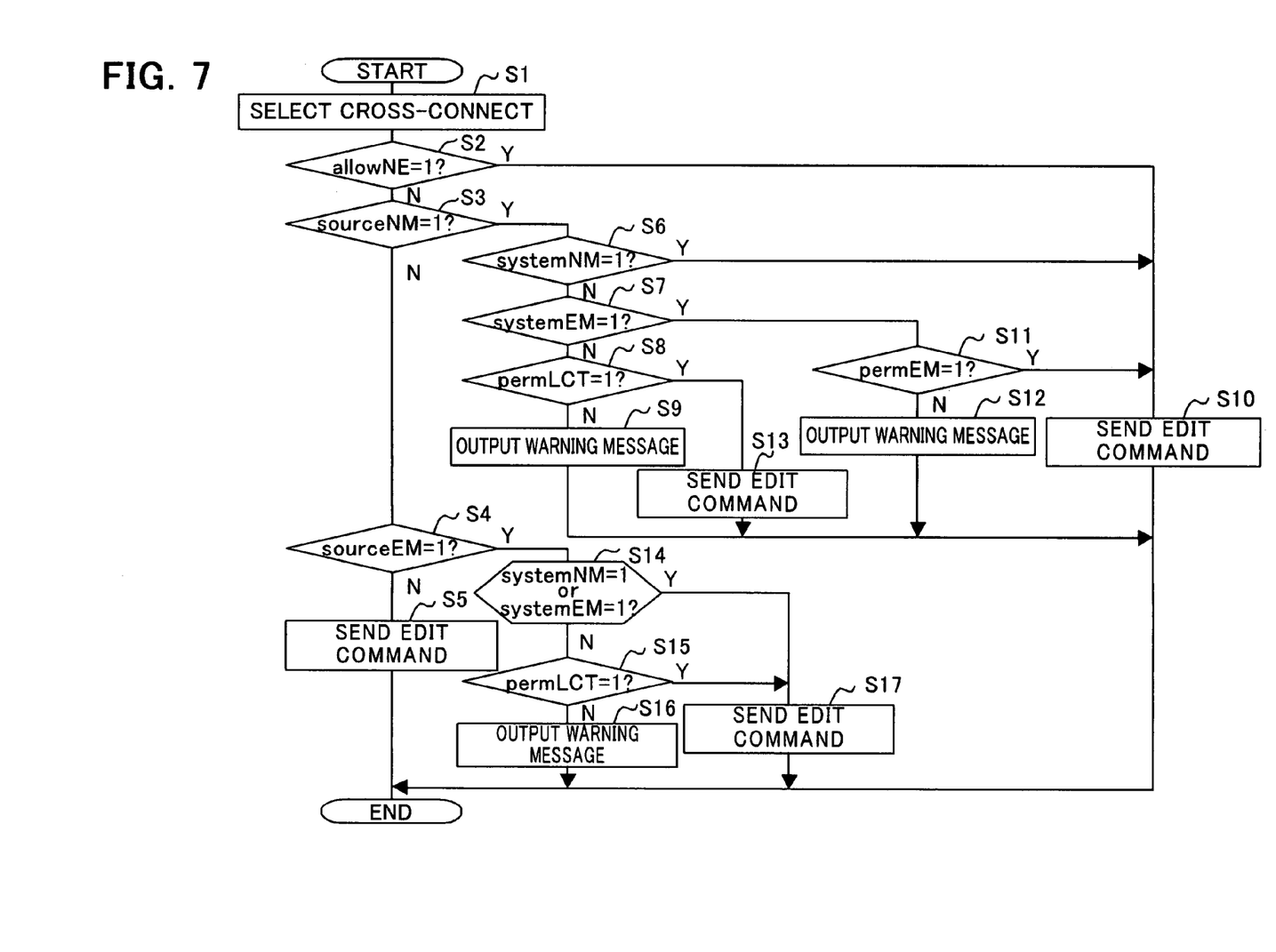
FIG. 7 is a flowchart showing the flow of processes effected by the NMS (or LCT: local craft terminal) that is the editing side in case that a network administrator instructs the NMS (or LCT) to edit the entering of the cross-connect.

FIG. 7 is a flowchart showing the flow of processes effected by the edit source NMS (or LCT) in case that the network manager instructs the NMS (or LCT) to edit the entered cross connect.

When the network manger selects an already entered cross-connect and operates to edit the selected cross-connect by use of the GUI shown in FIG. 3 (S1), the control unit 11 of the NMS reads cross-connect management data of the selected cross-connect from the database 14 and determines whether allowNE of the read cross-connect management data is 1 or not (S2).

If allowNE is 1, that is, if the authority of editing all the cross-connects of that NE is transferred in a blanket manner (Y at S2), then the editing operation is permissible even when the NMS is the NMS-NML 1 or the NMS-EML 21 or 22 (or LCT 31 to 34). Therefore, in this case, an edit command is created by the control unit 11, and the created edit command is added to the source information by the entry source information management unit 12a and then is sent from the command transmitting unit 15 to the NE (S10).

While on the contrary, if allowNE is not 1 (N at S2), then the control unit 11 determines whether sourceNM is 1 or not (S3). If sourceNM is 1 (Y at S3), then it is meant that the cross-connect has been entered by the NMS-NML 1, so that the control unit 11 determines whether the edit source NMS (i.e., NMS to which the control unit 11 belongs) is the NMS-NML 1, that is, whether systemNM is 1 or not (S6).

If systemNM is 1 (Y at S6), then the edit source NMS is the upper NMS-NML 1, and since that NMS has the authority for edit, the control unit 11 creates an edit command for sending (S10).

If sourceNM is not 1 (N at S6), then the control unit 11 determines whether the systemEM is 1 or not (S7). If systemEM is 1 (Y at S7), then the entry source of the cross-connect is the upper NMS-NML 1 and the edit source NMS is the lower NMS-EML 21 or 22, so that the control unit 11 determines whether the authority for editing has been transferred or not, that is, permEM is 1 or not (S11).

If permEM is 1 (Y at S11), then it is meant that the authority for editing has been transferred to the NMS-EML, so that the NMS-EML can perform editing and therefore the control unit 11 (that is, the control unit 11 of the NMS-EML) issues an edit command (S10).

On the contrary, if permEM is not 1 (that is, if it is 0) (N at S11), then the control unit 11 (that is, the control unit 11 of the NMS-EML) imparts a warning message to the GUI unit 13 to notify the network manager of being incapable of editing (S12), resulting in transmission of no edit commands.

At step S7, if systemEM is not 1, that is, if the edit source is any one of the LCTs 31 to 34 (N at S7), then the control unit (that is, the control unit of the LCT) determines whether permLCT is 1 or not, that is, whether the authority for editing has been transferred to the LCT (S8).

If the editing authority is transferred to the LCT (Y at S8), then the LCT (that is, the control unit 11 of the LCT) issues an edit command, whereas if the editing authority is not transferred to the LCT (N at S8), then the LCT imparts a warning message to the network manager (S9), resulting in transmission of no edit commands.

At step S3, if sourceNM is not 1, that is, if the edit source NMS is not the NMS-NML 1 (N at S3), then the control unit 11 determines whether sourceEM is 1 or not, that is, whether the entry source NMS is the NMS-EML or not (S4).

If sourceEM is 1, that is, if the entry NMS is the NMS-EML (Y at S4), then the control unit 11 determines whether systemNM or systemEM is 1 or not, that is, whether the NMS (edit source NMS) to which the control unit 11 belongs) is the NMS-NML 1 or NMS-EML 21 or 22 (S14).

If the NMS (edit source NMS) to which the control unit 11 belongs is the NMS-NML 1 or the NMS-EML 21 or 22 (S14), then the NMS has the authority for editing and therefore issues an edit command (S17).

While on the contrary, the NMS to which the control unit 11 belongs is not 1 nor 22, that is, it is the LCT (N at S14), then the control unit 11 determines whether permLCT is 1 or not, that is, whether the authority has been transferred to the LCT (S15). If the authority is transferred (Y at S15), then the LCT issues an edit command, whereas if the authority is not transferred (N at S15), then the LCT imparts a warning message to the network manager, resulting in transmission ofs no edit commands (S16).

On the other hand, if sourceEM is not 1 (that is, if it is not 0) at step S4 (N at S4), then it is meant that the cross-connect to be edited has been entered by the LCT, so that all of the NMS-NML 1, NMS-EML21 and 22, and LCTs can edit the entered cross-connect, resulting in the control unit 11 issuing an edit command (S5).

In this manner, it is determined in the edit source NMS or LCT whether edit of a cross-connect is permissible or not on the basis of its authority upon issuing an edit command of the cross-connect. Thus, any cross-connect can be prevented from accidentally being edited by the NMS or LCT having no authority, obviating occurrence of failure.

Figure 8:
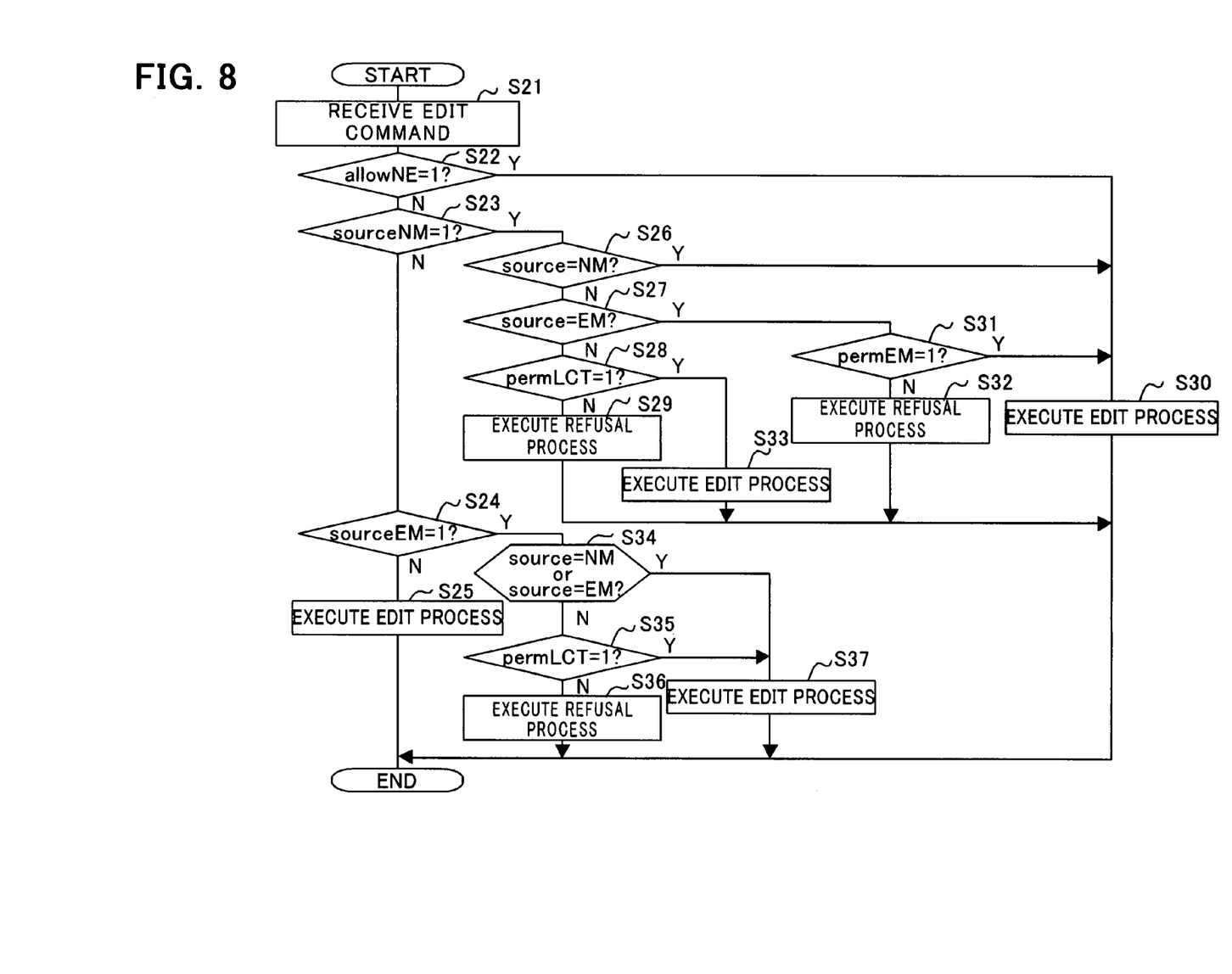
FIG. 8 is a flowchart showing the flow of processes effected by the NE editing the entered cross-connect.

FIG. 8 is a flowchart showing the flow of processes effected by the NE carrying out editing of an entered cross-connect.

When the information management unit 82 of the NE receives an edit command through the receiver unit 85 (S21), the information management unit 82 reads via the control unit 81 from the database 84 cross-connect entry data on a cross-connect to be edited in response to the edit command, and determines whether allowNE of the read cross-connect entry data is 1 or not (S22).

If allowNE is 1, that is, if the authority to edit the cross-connect is transferred in a blanket manner (Y at S22), then any NMS (and LCT) can perform editing of the cross-connect. Accordingly, in this case, the information management unit 82 notifies the control unit 81 that the cross-connect can be edited.

In response to the notification, the control unit 81 alters the setting of the cross-connect unit 83 and concurrently updates the cross-connect entry table of the database 84 into the content of the edited cross-connect (S30). The control unit 81 sends an edit complete response to the edit source NMS (or LCT) (S30).

On the contrary, if allowNE is not 1 (N at S22), then the control unit 11 determines whether sourceNM is 1 or not (S23). If sourceNM is 1, that is, if the cross-connect is entered by the NMS-NML 1 (Y at S23), then the information management unit 82 determines whether the edit source NMS (that is, the edit command sender NMS) is the NMS-NML 1 or not based on the source information contained in the edit command (S26).

If the edit source NMS is the NMS-NML 1 (Y at S6), it is meant that the entry source and the edit source result in the same NMS, which NMS has the authority for editing, so that the information management unit 82 executes the editing operation at step S30 as described above.

In case that the edit source is the NMS-EML (N at S26, Y at S27), then it is meant that the cross-connect entry source NMS is the upper NMS-NML 1 with the edit source NMS being the lower NMS-EML, so that the information management unit 82 determines whether the authority for edit has been transferred or not to the lower NMS-ELM, that is, whether permEM is 1 or not (S31).

Herein, the instance where permEM is 1 includes two instances, i.e., one where permEM of the cross-connect management data stored in the database 84 is 1 and the other where transfer of authority to the NMS-EML is written into the authority transfer field of the edit command received.

If permEM is 1 (Y at S31), then it is meant that the authority for edit has been transferred to the edit source NMS-EML, so that the editing is permissible. Accordingly, the information management unit 82 executes the editing process at step S30. On the contrary, permEM is not 1 (that is, if it is 0) (N at S31), then the editing is not permissible, so that the information management unit 82 does not perform the editing process but, as refusal process sends an edit NG response to the entry source NMS (or LCT) (S32). This results in no update of the cross-connect entry table of the database 81.

At step S27, if systemEM is not 1, that is, if the cross-connect to be edited is entered by the LCTs 31 to 34 (N at S27), then the information unit 82 determines whether permLCT is 1 or not, that is, whether the authority for editing has been transferred to the LCT (S28).

Herein, the instance where permLCT is 1 includes two instances, i.e., one where permLCT of the cross-connect management data stored in the database 84 is 1 and the other where transfer of authority to the LCT is written into the authority transfer field of the edit command received.

If the authority for editing is transferred to the LCT (Y at S28), then the information management unit 82 executes the same editing process as that of step S30 (S33), whereas if the authority for editing is not transferred to the LCT (N at S28), then the information management unit 82 executes the same refusal process as that of step S32 (S29).

At step S23, if sourceNM is not 1, that is, if the edit source NMS is not the NMS-NML 1 (N at S23), then the information management unit 82 determines whether sourceEM is 1 or not, that is, whether the entry source NMS is the NMS-EML or not (S24).

If sourceEM is 1, that is, if the entry source NMS is the NMS-EML (Y at S24), then the information management unit 82 determines whether the edit source is the NMS-NML or the NMS-EML or not (S34).

If the edit source NMS is the NMS-NML 1 or NMS-EML 21 or 22 (S34), then that NMS has the editing authority, so that the information management unit 82 executes the same editing process as that of step S30 (S37).

On the contrary, if the entry source is neither the NMS-NML 1 nor the NMS-EML 21 or 22, that is, if it is the LCT (N at S34), then it is determined that whether permLCT is 1 or not, that is, whether the authority for editing has been transferred to the LCT or not (S35). If the transfer of the authority is done (Y at step S35), then the information management unit 82 executes the editing process (S37), whereas if the transfer of the authority is not performed (N at S35), then the information management unit 82 executes the refusal process (S36).

On the other hand, if at step S24 sourceEM is not 1 (namely, if it is 0) (N at S24), then it is meant that the cross-connect to be edited has been entered by the LCT, so that all of the NMS-NML 1, NMS-EML 21 and 22 and LCTs can perform the editing operation, resulting in the information management unit 82 executing the editing process (S25).

Upon sending of the edit command or upon reception of the edit complete response, the edit source NMS may update the cross-connect management data stored in its database into the post-edit content.

The edit command sent from the edit source and the response from the NE may be sent to other NMS and LCT managing the NE to be edited, in the same manner as the case of new entry. As a result, the other NMS and LCT may perform updating of the cross-connect management table stored in its database.

In this manner, the NEs also edit the cross-connects based on the presence or absence of the editing authority, and hence the cross-connects can be prevented from being edited by the NMSes or LCTs having no authority, thus obviating the occurrence of failure such as unexpected line shutdown.

Operation Upon Deleting of Entered Cross-Connect

The processes effected by the NMS (LCT) and NE when deleting the entered cross-connect are substantially the same as those of the above editing operations, except that the command is a deletion command and that the process of the NE is deleting operation, and hence the description thereof will not be given herein.

Operation Upon Retrieving of Entered Cross-Connect

The retrieval operation of the entered cross-connect is specified by the GUI unit 13 of the NMS, the control unit 11 creates a retrieval command and sends the created retrieval command via the information management unit 12 from the transmitting unit 15 to the NE.

When receiving the retrieval command, the NE reads cross-connect entry data from the cross-connect entry table of the database 84, for returning to the command sender.

In response thereto, the NMS notifies the network manager (the person in charge of maintenance and service) of the cross-connect entry status, the entry sources and the authority transfer status based on the received cross-connect entry data.

It is to be noted that the NMS may notify the network manager, without sending the retrieval command to the NE, by reading required cross-connect information from the cross-connect management table stored in the database 14 of the NMS.

Addition of Authority Transfer Information

When the transfer of authority is specified by the network manager using the GUI interface of the NMS upon newly entering a cross-connect or editing the entered cross-connect, the control unit 11 sets to 1 the value of permEM or permLCT of the cross-connect management data of the cross-connect relating to the entering or editing and imparts a specification of transferring the authority to the authority transfer information management unit 12b.

On the based of the thus imparted specification, the authority transfer information management unit 12b writes information indicative of the transferee NMS or LCT into the permit field of an create command or edit command transmitted, and thereafter sends the create command or edit command through the transmitting unit 15.

Once receiving the create command or the edit command, the NE performs the entering or editing of a cross-connect based on the create command or the edit command as described above, and sets to 1 the value of permEM or permLCT of the cross-connect entry data.

The create command or the edit command is received by other NMSes or LCTs managing that NE than the entry source NMS, with the other NMSes or LCTs also setting to 1 the values of permEM or permLCT of their respective cross-connect management data.

Sending of Blanket Transfer Command, Blanket Inhibit Command and Authority Transfer Status Retrieval Command When the network manager specifies a blanket transfer of the authority by use of the GUI unit 13 of the NMS, the control unit 11 sets to 1 the values of allowNE of the cross-connect management data on all of cross-connects entered for the specified NE, and sends a blanket transfer command to the NE.

In response to the blanket transfer command received, the NE sets to 1 the value of allowNE of its cross-connect entry table.

The blanket transfer command is received by other NMSes or LCTs managing that NE than the sender NMS, with the other NMSes or LCTs also setting to 1 the values of allowNE of their respective cross-connect management data.

On the contrary, the upper NMS may cancel the authority blanket-transferred to the lower NMS or LCT, to present blanket inhibition.

When the network manager specifies the blanket inhibition by use of the GUI unit 13 of the NMS, the control unit 11 sets to 0 the values of allowNE of the cross-connect management data on all of cross-connects entered for the specified NE, and sends a blanket inhibit command to the NE.

In response to the blanket inhibit command received, the NE sets to 0 the value of allowNE of its cross-connect entry table.

The blanket inhibit command is received by other NMSes or LCTs managing that NE than the sender NMS, with the other NMSes or LCTs also setting to 0 the values of allowNE of their respective cross-connect management data.

The NMSes or the LCTs can verify the status of such blanket transfer of authority by sending a permission status verify command to the NE.

That is, when the network manager specifies the verification of the authority transfer status by use of the GUI unit 13 of the NMS (or LCT), the control unit 11 sends the permission status verify command to the specified NE.

Once receiving this permission status verify command, the NE reads out the value of allowNE of the cross-connect entry table and returns the read-out value to the sender NMS (or LcT). The control unit 11 of the NMS (or LCT) displays on the GUI unit 13 the authority transfer status based on the value received.

In the above embodiment, the NMSes or the LCTs may encrypt the source information or the authority transfer information to add the encrypted information to the command, or alternatively may encrypt for transmission the entirety of the command with the source information or authority transfer information added thereto.

Since the LCTs 31 to 34 perform their respective entries, etc., of cross-connects for the NEs 41 to 44, respectively, the LCTs may be considered as being included in the NMSes.

INDUSTRIAL APPLICABILITY

The present invention is applicable to a network management system managing a transmission network, in particular, a transmission network composed of transmission apparatuses transmitting signals through cross-connects. The present invention is applicable to a transmission apparatus, in particular, a transmission apparatus transmitting signals through cross-connects.

According to the present invention, cross-connects by the hierarchized network management system can be entered without any inconsistencies, and failures such as line shutdown caused by an operating mistake can be obviated without impairing the conveniences achieved at the time of ordinary operations.

The invention claimed is:

1. A network management system formed in hierarchized layers for managing a transmission apparatus which cross-connects signals for transmission, the system comprising:

an input unit inputting entry of a cross-connect of a transmission apparatus, edit of the cross-connect entered into the transmission apparatus, or cancellation of the cross-connect entered into the transmission apparatus;

a command generating unit generating a command to instruct the transmission apparatus on the entry, the edit or the cancellation of the cross-connect input by the input unit;

an information adding unit adding information indicative of a network management system in the hierarchized layers serving as an entry source, an edit source or a cancellation source to the command generated by the command generating unit;

a transmitting unit transmitting to the transmission apparatus the command with the information added thereto by the information adding unit;

a storing unit storing data indicative of whether authority to edit or cancel the cross-connect is present or not; and a determining unit determining whether the authority to edit or cancel is present or not based on the data stored in the storing unit in case that the edit or the cancellation is input by the input unit, wherein the command generating unit, the information adding unit and the transmitting unit execute the respective processes in case that the determining unit determines the authority as being present.

2. A network management system formed in hierarchized layers for managing a transmission apparatus which cross-connects signals for transmission, the system comprising:

an input unit inputting entry of a cross-connect of a transmission apparatus, edit of a cross-connect entered into the transmission apparatus, or cancellation of the cross-connect entered into the transmission apparatus;

a specifying unit specifying a network management system to which authority to edit or cancel the cross-connect is transferred;

a command generating unit generating a command to instruct the transmission apparatus on the entry, the edit or the cancellation of the cross-connect input by the input unit;

an information adding unit adding information indicative of a network management system in the hierarchized layers, specified by the specifying unit to the command generated by the command generating unit;

a transmitting unit transmitting to the transmission apparatus the command with the information added thereto by the information adding unit;

a storing unit storing data indicative of whether the authority to edit or cancel the cross-connect is present or not; and a determining unit determining whether the authority to edit or cancel is present or not based on the data stored in the storing unit and on the network management system specified by the specifying unit in case that the edit or the cancellation is input by the input unit, wherein the command generating unit, the information adding unit and the transmitting unit execute the respective processes in case that the determining unit determines the authority as being present.

3. A transmission apparatus which cross-connects signals for transmission comprising:

a command receiving unit receiving from a network management system formed in hierarchized layers a command ordering entry of a cross-connect, edit of the entered cross-connect or cancellation of the entered cross-connect, the command containing information representative of the network management system serving as an entry source, an edit source or a cancellation source;

a control unit entering, edit or cancel a cross-connect based on the command received by the command receiving unit;

a storing unit storing the information representative of the network management system contained in the command received by the command receiving unit, in association with entry information on the entered or edited cross-connect;

a retrieval request receiving unit receiving from the network management system a retrieval request for the cross-connect entry information and the information representative of the network management system stored in the storing unit; and a replying unit replying to the network management system the cross-connect entry information and the information representative of the network management system in association with each other, based on the retrieval request received by the retrieval request receiving unit.

4. A transmission apparatus which cross-connects signals for transmission comprising:

a command receiving unit receiving from a network management system formed in hierarchized layers a command ordering entry of a cross-connect, edit of the entered cross-connect or cancellation of the entered cross-connect, the command containing information representative of the network management system serving as an entry source, an edit source or a cancellation source;

a control unit entering, edit or cancel a cross-connect based on the command received by the command receiving unit;

a storing unit storing the information representative of the network management system contained in the command received by the command receiving unit, in association with entry information on the entered or edited cross-connect; and a determining unit, in case that a command received by the command receiving unit is a command ordering edit or cancellation of the cross-connect, comparing information representative of the network management system serving as an edit source or a cancellation source contained in the command with information representative of the network management system stored in the storing unit in association with the cross-connect entry information determine whether the network management system as the edit source or the cancellation source contained in the command has authority for edit or cancellation, wherein the control unit executes the edit or deletion of the cross-connect if the network management system as the edit source or the cancellation source has the authority as a result of the determination effected by the determining unit, with the control unit not executing the edit and deletion if not.

5. A transmission apparatus which cross-connects signals for transmission comprising:

a command receiving unit receiving from a network management system formed in hierarchized layers a command ordering entry of a cross-connect, edit of the entered cross-connect or cancellation of the entered cross-connect, the command containing information representative of the network management system serving as an entry source, an edit source or a cancellation source;

a control unit entering, edit or cancel a cross-connect based on the command received by the command receiving unit;

a storing unit storing the information representative of the network management system contained in the command received by the command receiving unit, in association with entry information on the entered or edited cross-connect, wherein the command further contains authority transfer information on transfer of authority to edit or delete the entered cross-connect, and wherein the storing unit stores the authority transfer information in association with the cross-connect entry information.

6. The transmission apparatus according to claim 5, further comprising a determining unit, in case that a command received by the command receiving unit is a command ordering edit or cancellation of the cross-connect, comparing representative of the network management system serving as an edit source or a cancellation source contained in the command with the authority transfer information stored in the storing unit in association with the cross-connect entry information, to determine whether the network management system as the edit source or the cancellation source contained in the command has authority for edit or cancellation, wherein the control unit executes the edit or deletion if the network management system as the edit source or the cancellation source has the authority as a result of the determination effected by the determining unit, with the control unit not executing the edit and deletion if not.

7. The transmission apparatus according to claim 5, further comprising:

a retrieval request receiving unit receiving from network management system a retrieval request for the cross-connect entry information and the authority transfer information stored in the storing unit; and a replying unit replying to the network management system the cross-connect entry information and the authority transfer information in association with each other, based on the retrieval request received by the retrieval request receiving unit.

8. A transmission apparatus which cross-connects signals for transmission comprising:

a command receiving unit receiving from a network management system formed in hierarchized layers a command ordering entry of a cross-connect, edit of the entered cross-connect or cancellation of the entered cross-connect, the command containing information representative of the network management system serving as an entry source, an edit source or a cancellation source;

a control unit entering, edit or cancel a cross-connect based on the command received by the command receiving unit;

a storing unit storing the information representative of the network management system contained in the command received by the command receiving unit, in association with entry information on the entered or edited cross-connect;

a blanket transfer command receiving unit arranged to receive from the network management system a blanket transfer command to blanket-transfer edit or deletion of the cross-connect on the network-element by network-element basis, wherein the storing unit stores information indicative of the blanket transfer received by the blanket transfer command receiving unit, in association with the cross-connect entry information;

a retrieval request receiving unit receiving from the network management system a retrieval request for the cross-connect entry information and the information indicative of the blanket transfer stored in the storing unit; and a replying unit replaying to the network management system the cross-connect entry information and the authority transfer information stored in the storing unit, in association with each other, based on the retrieval request received by the retrieval request receiving unit.

* * * * *